United States Patent [19]

Nyce et al.

[11] Patent Number: 5,367,255
[45] Date of Patent: Nov. 22, 1994

[54] MAGNETOSTRICTIVE POSITION TRANSDUCER WITH BAND PASSED MODE CONVERTER OUTPUT FOR REJECTING MECHANICAL NOISE

[76] Inventors: David S. Nyce, 2633 Whistling Quail Run, Apex, N.C. 27502; Wade D. Peterson, 2422H Gazebo Dr., Morrisville, N.C. 27560; Theophile R. Lerebours, 200 Howland Ave., Cary, N.C. 27513

[21] Appl. No.: 800,974

[22] Filed: Dec. 2, 1991

[51] Int. Cl.$^5$ .............................................. G01B 7/14
[52] U.S. Cl. ........................... 324/207.13; 324/207.12; 324/207.22
[58] Field of Search .................. 324/207.12, 207.13, 324/207.22, 207.24, 533; 333/148; 73/313, 314

[56] References Cited

U.S. PATENT DOCUMENTS

| | | | |
|---|---|---|---|
| 3,255,406 | 6/1966 | Schluter | 324/533 X |
| 3,898,555 | 8/1975 | Tellerman | 333/148 X |
| 4,151,459 | 4/1979 | Fayolle et al. | 324/533 |
| 4,721,902 | 1/1988 | Tellerman et al. | 324/207.13 X |
| 4,952,873 | 8/1990 | Tellerman | 333/148 X |
| 5,107,210 | 4/1992 | Shirao et al. | 324/207.12 |

FOREIGN PATENT DOCUMENTS

| | | | |
|---|---|---|---|
| 0083238 | 5/1984 | Japan | 324/207.13 |
| 0956965 | 9/1982 | U.S.S.R. | 324/207.13 |

OTHER PUBLICATIONS

'The "A-B-C's" of Magnetostrictive Delay Lines', LFE Electronics Pamphlet, 11 pages, received in USPTO on Jan. 26, 1988.

*Primary Examiner*—Gerard R. Strecker

[57] ABSTRACT

A magnetostrictive linear position transducer of the type having an acoustic magnetostrictive waveguide for propagating acoustic pulses generated by the interaction of a permanent magnetic field with a periodic excitation magnetic field. The mode convertor for converting acoustic pulse into an electrical signal indicative of the passage of an acoustic pulse propagated pat the mode convertor location along the waveguide includes a passband type filter for improving the detectability of the acoustic signal.

6 Claims, 4 Drawing Sheets

MAGNETOSTRICTIVE POSITION TRANSDUCER WITH BAND PASSED MODE CONVERTER OUTPUT FOR REJECTING MECHANICAL NOISE

BACKGROUND OF INVENTION

1. Field of Invention

The present invention relates to a magnetostrictive transducer which includes a signal reception subsystem which improves the performance of the system in the presence of mechanical noise.

2. Description of the Prior Art

Magnetostrictive position transducers are well known in the art, and are widely used as position measurement devices. U.S. Pat. No. 3,898,555 to Tellerman shows a linear distance measuring device which utilizes magnetostrictive effects. This patent teaches the use of a tubular waveguide, having a coaxial wire running through the center, of the waveguide. An electrical excitation pulse sent through the wire produces a magnetic field in the vicinity of the waveguide. Perturbations in this magnetic field caused by a position indicating magnet generate torsional strain waves within the gauge. These acoustic waves are detected by a mode converter, affixed to one end of the transducer. The time of flight of the acoustic return signal indicates the position of the position magnet along the waveguide.

Mechanical noise communicated to the waveguide can corrupt the acoustic signal, making detection of the return signal difficult.

SUMMARY OF THE INVENTION

In the present invention, the signal output from the mode converter is filtered to improve the discrimination of the signal generated by the position indicating magnet. It has been found that passband filtration can eliminate substantial amounts of mechanical noise from the mode converter signal.

DETAILED DESCRIPTION OF THE PREFERRED EMBODIMENTS

Figure 1:
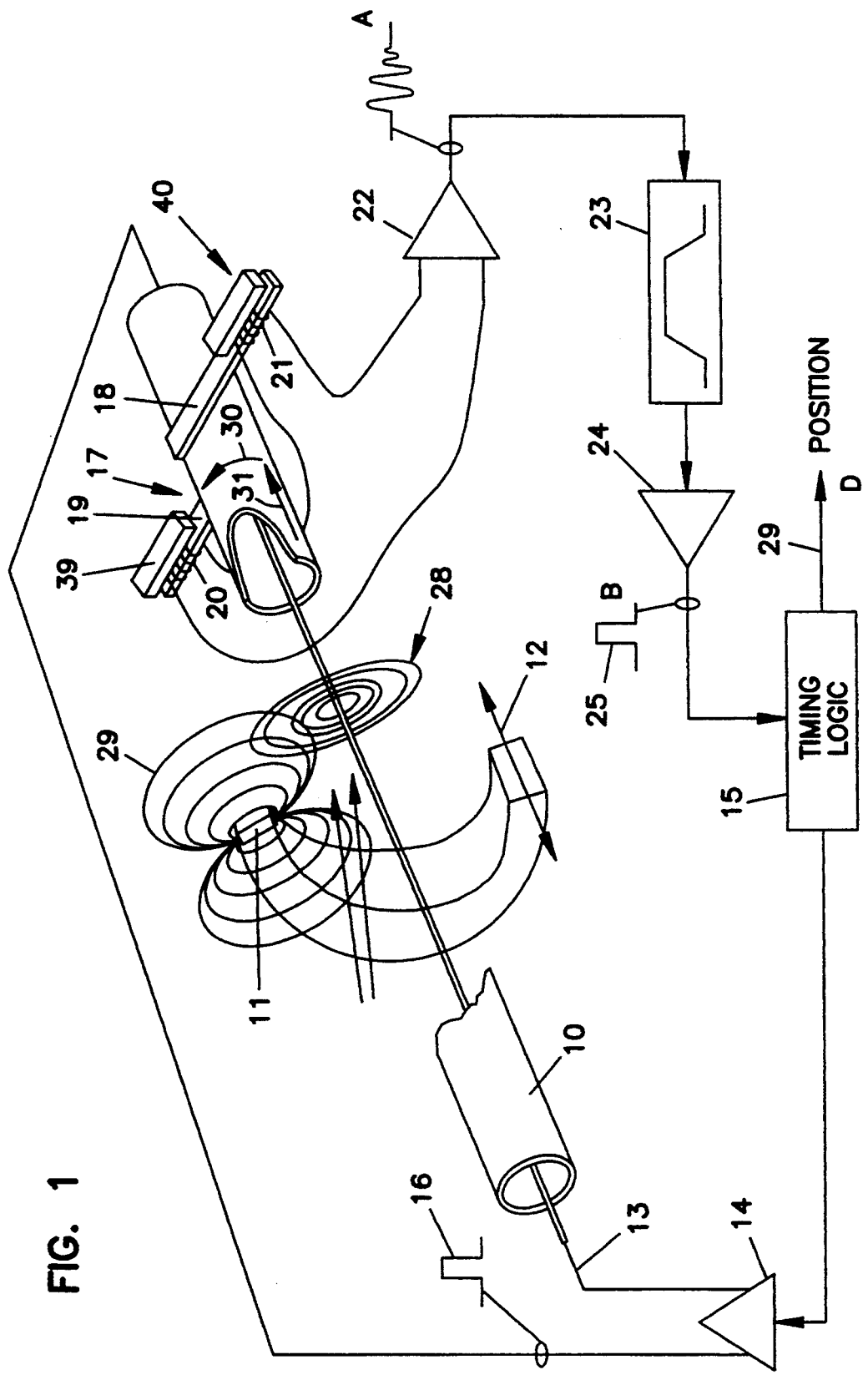
FIG. 1 is a schematic diagram depicting, the mechanical layout of the waveguide and mode converter as well as a block system level block diagram for the electronic portion of the transducer.

FIG. 1, shows the general physical layout of a magnetostrictive transducer according to the present invention. The active stroke for the transducer is a length 12 defined along the waveguide 10. A position indicating magnet 11 is located proximate the waveguide 10. This magnet 11 may be moved along the active measurement portion of the transducer. In operation, the position of the magnet 11 is determined by exciting the waveguide with a current pulse 16 through coaxial wire 13. The required current pulse is delivered by driver circuitry 14 driven by the excitation and timing logic 15.

Figure 2:
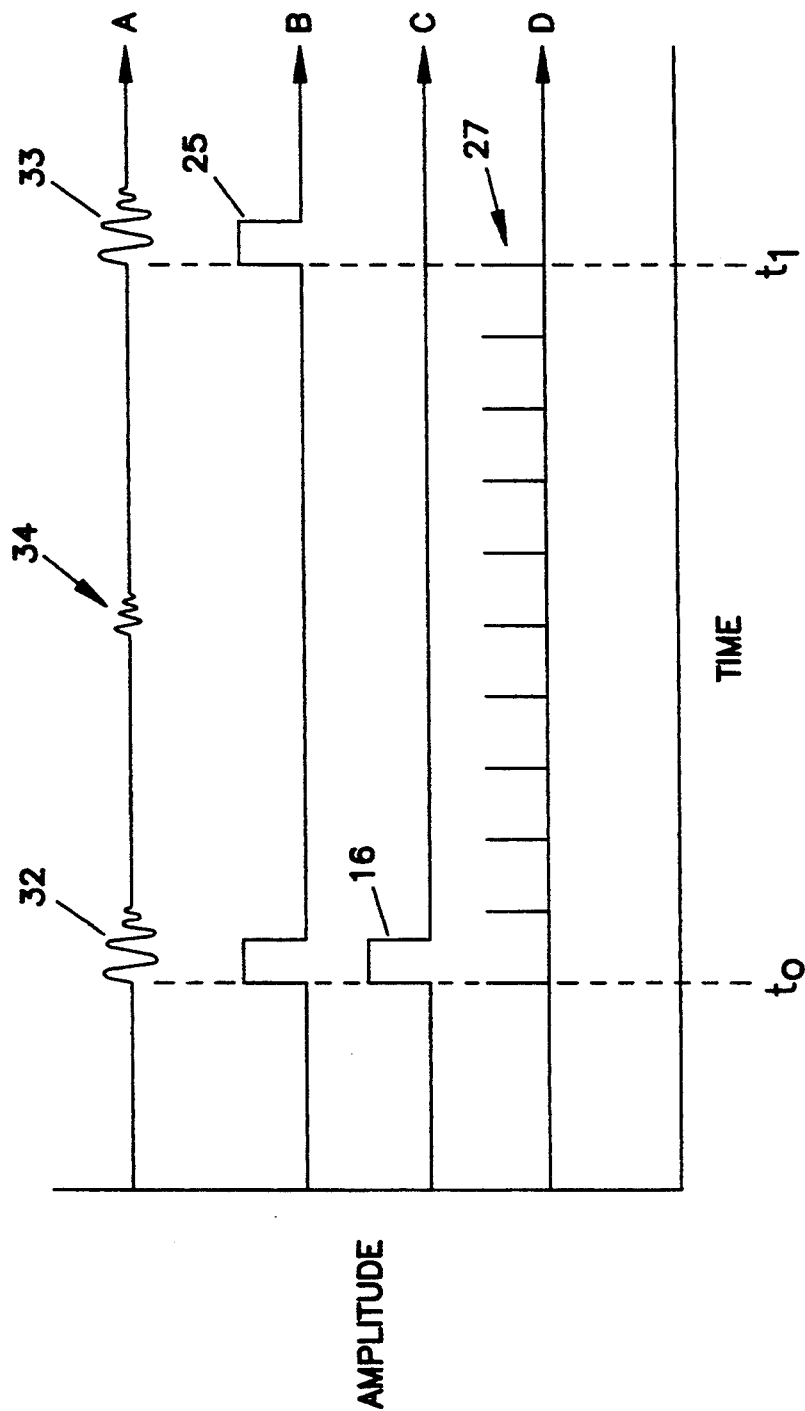
FIG. 2 is a wave form diagram depicting the operation of a magnetostrictive transducer.

FIG. 2, shows an illustrative square wave excitation pulse, at 16 on waveform C. This pulse generates a magnetic field 28 which surrounds the waveguide 10 and interacts with the magnetic field 29 of the position indicating magnet 11 and generates a torsional acoustic pulse depicted by the pair of vectors 30 and 31. The time domain waveform of a typical acoustic pulse is very complex and is depicted on FIG. 2 on waveform A by event 33. A mechanical noise pulse is depicted at 34 in the same wave form. The acoustic pulse 33 caused by the interaction between the magnet 11 and waveguide 10, travels along waveguide 10 toward the mode converter generally designated 17.

A preferred form of mode converter for receiving acoustic pulses, consists of a pair of tapes 18 and 19, rigidly attached to the waveguide 10. Strain in the tapes caused by the passage of the acoustic pulse past their location generates a change in their magnetization in accordance with the Villari effect. The variable permeability of the tapes in combination with the field supplied by the bias magnets 39 and 40 results in a variation in the flux through sense coils 20 and 21. These signals are provided to an appropriate wide band differential amplifier 22, which provides gain and impedance transformation for a band pass filter 23. The band pass filter 23 selectively attenuates signals outside of the pass band. The bandpassed wave form is supplied to additional amplifier and comparator circuitry 24, which generates a logic level pulse 25 when an acoustic echo has been detected by the mode converter.

In operation, the excitation and timing logic 15 initiate the interrogation pulse 16 and starts a timing counter. The counter portion of the timing logic 15 collects pulses generally designated 27 from the excitation time T0 to the reception time T1. Thus, the total number of pulses represents the time period required for the acoustic pulse to be propagated from the location of the magnet 11 to the position of the mode converter 17. This count is supplied as the position indication 29 from the excitation and timing logic 15. Commercially available magnetostrictive transducers such as the "Temposonics" transducer manufactured by MTS Systems, Mpls Minn., contain structures of this type except for the passband filter. These commercially available structures are suitable for carrying out the present invention. Further details concerning other structures suitable for carrying out the invention may be found in U.S. Pat. Nos. 4,952,873, to Tellerman; 3,898,555, to Tellerman, which are incorporated by reference herein.

Figure 3:
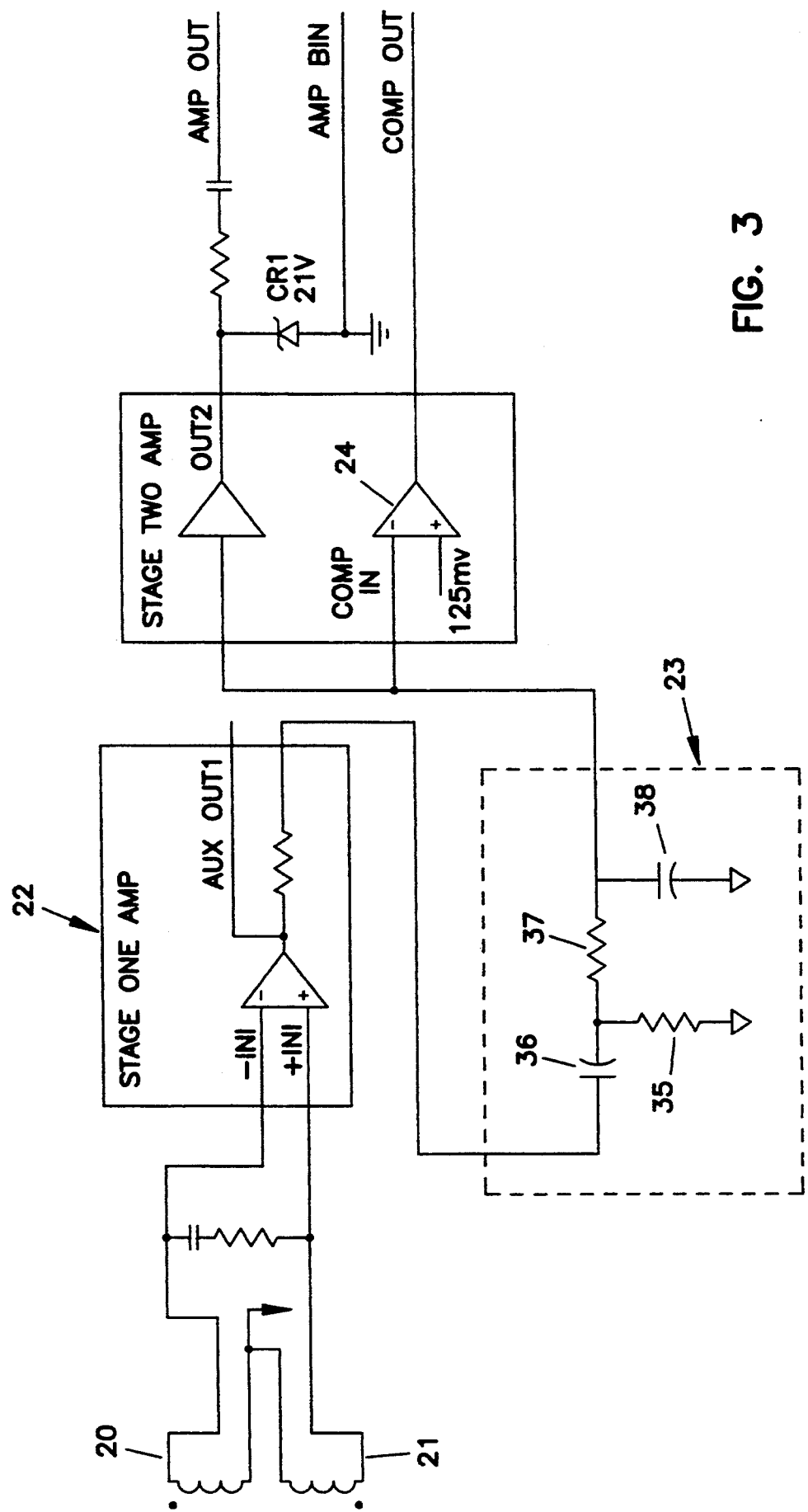
FIG. 3 is a partial schematic diagram depicting illustrative structure for carrying out the invention; and, FIG. 4 is an alternative filter structure.

Although any of a variety of pass band filters may be used to implement the filter 23, it is preferred to use a passive RC network, shown in FIG. 3, having a maximally flat response and corner frequencies of 150 kHz. and 650 kHz. with a center frequency of 300 kHz. The preferred two pole RC filter is depicted in FIG. 3, along with the attendant ancillary circuitry 22 and 24, which interface the band pass filter with the remainder of the electronic subsystems of the transducer. In the preferred embodiment the first pole is defined by an RC network including resistance 35 and capacitance 36. The second pole is defined by resistance 37 and capacitance 38.

It is important to note that the passband characteristics for the filter are not selected based upon the spectral characteristics of the excitation waveform which is inherently broadband. But rather, the passband is determined empirically and optimized for each transducer configuration. In general it is preferable to center the pass band on the estimated center frequency of the acoustic pulse.

Filter type is also optimized for each transducer type. Maximally flat filters, minimum phase shift filters, and constant phase shift filters may be optimum for various applications. Therefore, although a preferred passive two pole filter is depicted in FIG. 3, it should be apparent to one of ordinary skill in the art, that a variety of active filters and other filter responses can be used to tailor and optimize the system for particular transducer applications.

Figure 4:
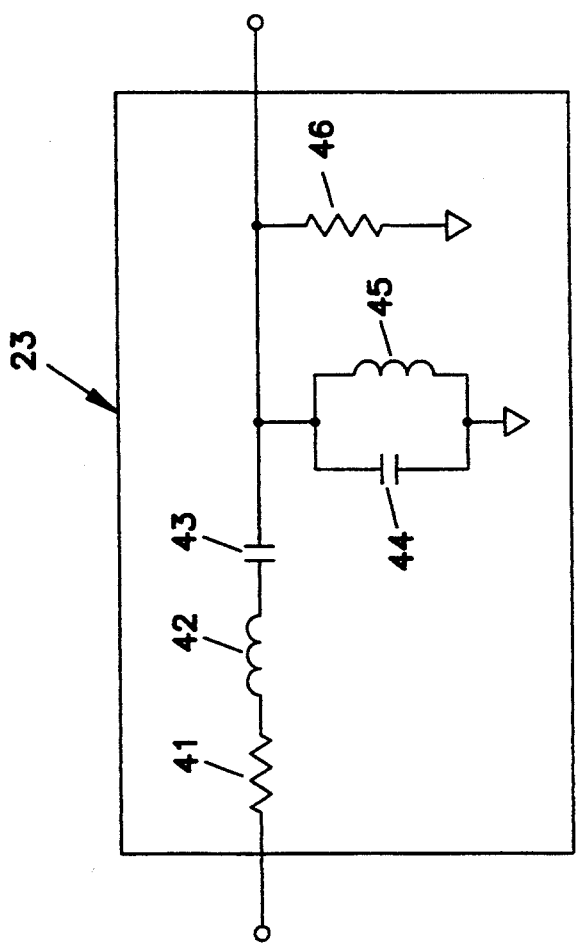

For example the Bessel filter set forth in FIG. 4. exhibits linear phase delay and has no overshoot when a step function signal is applied. Therefor the following exemplary filter structures should be considered exemplary and not limiting of filter type.

| Filter Example 1. see FIG. 3 | |
| --- | --- |
| element 36 | 1000 pF capacitor |
| element 35 | 1.1K ohms resistor |
| element 37 | 4.75K ohms resistor |
| element 38 | 56 pF capacitor |
| Filter Example 2. see FIG. 4 | |
| element 41 | 50 ohms resistor |
| element 42 | 15 micro H inductor |
| element 43 | .015 micro F capacitor |
| element 44 | .022 micro F capacitor |
| element 45 | 10 micro H inductor |
| element 46 | 50 ohms resistor |

We claim:

1. A magnetostrictive transducer comprising:

a magnetostrictive waveguide forming a measurement gauge;

excitation means coupled for said waveguide for generating a magnetic field surrounding said waveguide forming a broad band excitation pulse;

position magnet means located near said waveguide and mounted for motion with respect to said waveguide, for generating an acoustic pulse in said waveguide at the location of said position magnet means, as a reaction to the magnetic field surrounding said waveguide;

mode converter means coupled to said waveguide for producing a mode converter output signal in response to the passage of said acoustic pulse past the location of said mode convertor means;

passband filter means coupled to said mode converter means for filtering said mode converter output signal and for rejecting mechanical noise present on said waveguide, and for producing a passband filter output indicative of the detection of said acoustic pulse;

timer means coupled to said excitation means and to said passband filter means for measuring the time between generation of said excitation pulses and the reception of acoustic pulses, for producing an indication of the location of said position magnet means along said waveguide.

2. The apparatus of claim 1 wherein said passband filter means comprises a two pole filter, having a first pole defining a lower cutoff frequency and a second pole defining an upper cutoff frequency.

3. The apparatus of claim 2 wherein said first pole defines a lower cutoff frequency of substantially 150 kilohertz.

4. The apparatus of claim 2 wherein said second pole defines an upper cutoff frequency of substantially 650 kilohertz.

5. The apparatus of claim 1 wherein said passband filter means is characterized by a maximally flat response with a lower corner frequency between 50 and 200 kilohertz and an upper corner frequency between 500 and 1000 kilohertz.

6. The apparatus of claim 5 wherein said passband filter means comprises a two pole filter having a first pole defined by a first resistance and a first capacitance and a second pole being defined by a second resistance and a second capacitance.

* * * * *

UNITED STATES PATENT AND TRADEMARK OFFICE
CERTIFICATE OF CORRECTION

PATENT NO. : 5,367,255

DATED : November 22, 1994

INVENTOR(S) : Nyce et al.

It is certified that error appears in the above-identified patent and that said Letters Patent is hereby corrected as shown below:

On cover page, at [54], please delete the title, "MAGNETOSTRICTIVE POSITION TRANSDUCER WITH BAND PASSED MODE CONVERTER OUTPUT FOR REJECTING MECHANICAL NOISE", and insert therefor --MAGNETOSTRICTIVE TRANSDUCER WITH BANDPASSED MODE CONVERTER OUTPUT--

On cover page after "N.C. 27513", please insert --[73] MTS Systems Corp., Eden Prairie, MN 55344--

In column 1, please delete the title, "MAGNETOSTRICTIVE POSITION TRANSDUCER WITH BAND PASSED MODE CONVERTER OUTPUT FOR REJECTING MECHANICAL NOISE", and insert therefor --MAGNETOSTRICTIVE TRANSDUCER WITH BANDPASSED MODE CONVERTER OUTPUT--

In column 2, line 4, before "FIG. 2", please delete the word "on", and insert therefor --in--

In column 4, line 6, please delete the word "convertor", and insert therefor --converter--

Signed and Sealed this

Twelfth Day of December, 1995

Attest:

BRUCE LEHMAN

Attesting Officer

Commissioner of Patents and Trademarks